United States Patent [19]

Pedretti et al.

[11] 4,429,089

[45] Jan. 31, 1984

[54] POLYMERIZING AND COPOLYMERIZING DIOLEFINES, AND MEANS THEREFOR

[75] Inventors: Ugo Pedretti, Milan; Gabriele Lugli, San Donato Milanese; Sergio Poggio, Milan; Alessandro Mazzei, San Donato Milanese, all of Italy

[73] Assignee: Anic, S.p.A., Palermo, Italy

[21] Appl. No.: 283,615

[22] Filed: Jul. 15, 1981

Related U.S. Application Data

[63] Continuation of Ser. No. 129,640, Mar. 12, 1980, abandoned, which is a continuation of Ser. No. 928,552, Jul. 27, 1978, abandoned.

[30] Foreign Application Priority Data

Aug. 1, 1977 [IT] Italy ............................. 26377 A/77

[51] Int. Cl.$^3$ ........................... C08F 4/72; C08F 36/04
[52] U.S. Cl. ..................................... 526/153; 526/114; 526/122; 526/133; 526/157; 526/161; 526/164; 526/337; 526/340.2; 526/340.4; 502/152
[58] Field of Search ........... 252/429 B, 429 C, 431 R, 252/431 P, 431 C; 526/114, 122, 133, 153, 157, 161, 164

[56] References Cited

U.S. PATENT DOCUMENTS

| | | | |
|---|---|---|---|
| 3,297,667 | 1/1967 | Von Dohlen et al. | 526/164 |
| 3,394,156 | 7/1968 | Kornicker et al. | 526/161 |
| 3,657,205 | 4/1972 | Throckmorton | 526/122 |
| 3,676,411 | 7/1972 | Throckmorton et al. | 526/157 |
| 3,773,734 | 11/1973 | Cucinella et al. | 526/161 |
| 3,935,175 | 1/1976 | Lugli et al. | 526/133 |

FOREIGN PATENT DOCUMENTS 865248 4/1961 United Kingdom ................. 526/164

*Primary Examiner*—Edward J. Smith
*Attorney, Agent, or Firm*—Morgan, Finnegan, Pine, Foley & Lee

[57] ABSTRACT

A novel catalytic system is disclosed which is especially adapted for the polymerization and the copolymerization of aliphatic conjugated diolefines, the system comprising an organic compound of aluminum, a Lewis acid containing at least one halogen, and an organic compound of a lanthanide metal. The catalyst system has outstanding and hitherto unparalleled activity. The method of preparation of the catalytic system is also described in detail.

14 Claims, No Drawings

POLYMERIZING AND COPOLYMERIZING DIOLEFINES, AND MEANS THEREFOR

This is a continuation of application Ser. No. 129,640 filed Mar. 12, 1980 which is a continuation of application Ser. No. 928,552 filed July 27, 1978, both applications now abandoned.

This invention relates to a method for polymerizing and copolymerizing diolefines employing a novel catalytic system. The invention also relates to the catalytic system employed therein.

The catalytic system in question is composed of an aluminum compound, a Lewis acid, and a particular compound belonging to the Lanthanide series and permits carrying out polymerization and copolymerization reactions starting with diolefines to give products having a high content of 1,4-cis units and satisfactory technological properties.

Catalysts based on derivatives of the rare earth metals are known for use in the polymerization of unsaturated compounds.

For example, German Published Application No. 2,011,543 relates to a method for the preparation of a catalytic system for use in the polymerization of diolefines and in which a ternary composition formed by an organic compound of aluminum which contains at least one C-Al bond, an organic metallic compound of a metal belonging to Group III-B of the Periodic System, Lanthanide therein included, and a compound containing one or more halide ions is disclosed. The metallic organic compound of the Lanthanides is defined as a co-ordination compound and comprises organic ligands having from 1 to 20 carbon atoms.

Such ligands can be either monovalent and bidentate form or bivalent and bidentate form.

Furthermore, U.S. Pat. No. 3,641,188 refers to a catalytic composition formed by four components. These components are are a compound of a metal of the Lanthanides series, a reducing compound of aluminum, a non-protonic Lewis acid and a phoshine ligand The compound of the Lanthanide can also be a co-ordination compound with a monodentate ligand. The catalytic system in question is capable of polymerizing ethylenically unsaturated compounds to give polymers having extremely low molecular weights, and the fact is emphasized that linkings of not more than four monomerides are obtained.

Applicants have now found, and this is the subject matter of the present invention, that it is possible to obtain polymers of diolefins having high molecular weights and high contents of 1,4-cis units by using a 3-component catalytic system, the first component being a compound of aluminum not bound to the presence of an Al-C bond, the second being a Lewis acid which contains at least one halogen and the third being a compound of a metal belonging to the series of the Lanthanides and united to a monovalent monodentate ligand.

More precisely, the catalytic system of the invention is comprises by:

(A) an organic metallic compound of aluminum selected from the following two classes of compounds:

(a) R Al X Y
wherein
R can be hydrogen or a hydrocarbonaceous radical having from 1 to 20 carbon atoms X can be a hydrocarbonaceous radical, hydrogen, halogen, alkoxy, thioalkoxy or an amino group and Y can be hydrogen, a hydrocarbonaceous radical having from 1 to 20 carbon atoms or halogen, and wherein R is a hydrogen atom when X and Y are both halogens;

(b) a compound of a polymeric nature having the formula:

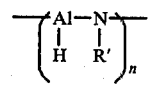

wherein R' is a hydrocarbonaceous radical having from 1 to 20 carbon atoms and n is the number of repetitive units, as already described by the present applicants (J. Organometal. Chem., 78, (1974) and Ibid. 129, 281 (1977)) and in the cited references;

(B) a compound containing at least a halide ion. Such compound can be indicated by the general name of "Lewis acid" and comprises:

haloid acids halides, that is alkyl-halides of the metals of Groups III-A and IV-A, such as $BCl_3$, $AlCl_3$ $AlCl_3.Et_2O$, $AlBr_3$, $AlI_3$, $SnCl_4$ and Al $R_2Cl$ and $AlRCl_2$ in which R is an alkyl radical of from 1 to 20 C atoms;

halides and alkyl halides of the metals of Group IV-B, V-B and VI-B such as $TiCl_4$, $VCl_4$, $MoCl_5$ and $CH_3TiCl_3$;

(C) a complex of a metal belonging to the series of the lanthanides having an atomic number from 57 to 71 of the Periodic System, in which the ligand, directly bound to the metal, is a monovalent and monodentate organic radical selected from among the following groups: alcoholic ($-OR_1$), dialkylaminic ($-NR_1R_2$), thioalcoholic ($-SR_1$), phosphinic ($-PR_1R_2$) and others and wherein $R_1$ and $R_2$ are the same or different from one another and can be an alkyl, cycloalkyl or aryl group containing from 1 to 20 carbon atoms. Characteristic compounds of this type as disclosed herein are, for example, the tri-alcoholates of the Lanthanides, $Ln(OR)_3$, thetrialkylamides of the Lanthanides $Ln(NR_1R_2)_3$, the tris-thioalcoholates of the Lanthanides $Ln(SR)_3$, the dialkyl phosphinates of the Lanthanides, $Ln(PR_1R_2)_3$ and others.

Among the metals belonging to the family of the rare earth elements in the complexes, the preferred are Lanthanium, Praseodymium, Neodymium, Samarium, Gadolinium and Dysprosium.

A characteristic feature of the catalytic system of this invention is the formation of polymers having a content of 1,4-cis units which is the highest of all those known heretofore and, simultaneously, having molecular weights and molecular weight, distributions that are variable within a wide range Consequently, the catalytic system of the invention permits the production of polymers with properties which are adaptable to a number of practical application requirements.

It is known, in fact, that the technological properties of a dienic elastomer having a 1,4-cis structure are a function of its steric purity, the curve of distribution of the molecular weights, and the mean value of the molecular weight.

It is known that a few synthetic elastomers, among which there are, for example, the poly-isoprene-1,4-cis, and the poly-butadiene-1,4-cis, can crystallize due to the effect of heavy applied stresses (drawing).

The occurrence of crystallinity leads to a self-reinforcement effect in the material, with a considerable improvement of its mechanical properties such as tensile strength or tear-resistance. (Thor, L. et al., Polymer Engineering and Science, 17, 129 (1977)).

The capability of crystallizing and the magnitude of the crystallization are a function of the content of 1,4-cis units of the polymer, that is to say, of its stereoregularity. Not only this, but also the temperature at which the elastomer crystallizes is a function of such stereoregularity.

The polyisoprene-1,4-cis has a favorable behaviour with respect to crystallization, that is, it has a tendency to crystallize under a pulling stress at comparatively high temperatures.

In the polybutadiene-1,4-cis, crystallization takes place at room temperature only in the case in which the content of 1,4-cis units is very high (L. Gargani et al., Angew Makrom. Chem., 50, 101, (1976)). There is, thus, a practical interest in having a polymer of butadiene which is totally of 1,4-cis structure since it can be crystallized also under a pulling stress at temperatures higher than ambient temperatures and this property is commonly a prerequisite in many applications, such as in pneumatic tires.

Summing up, the structural prerequisities for a good crystallizable elastomer are:

a high tacticity of the macromolecules in order that a sufficient degree of crystallization may be achieved under drawing;

an appropriate melting point temperature situated in the temperature range at which the elastomer is required to work from the point of view of the practical applications.

The distribution of the molecular weights which is the most desirable is a function of the prospective applications. In general, if the elastomer must be processed by roll mills or by extruders, it is an asset to have a wide distribution (e.g. a ratio of the weighted average mole wt to the numerical arithmetic mean mol wt, $Mw/Mn$, higher than 4), because it improves the extrudibility and the capability of efficiently dispersing the compounding ingredients (M. Tokita et al., Rubber Chem. and Technol., 46, 1166, (1973)).

If, however, it is desired, for example, to dissolve the polymer in a solvent (such as in the production of antishock polystyrene in the "in mass" process, or in the production of certain types of adhesives), it is an advantage to have a product with a narrow distribution ($Mw/Mn$ in the range of from 1 to 2) which is dissolved in a shorter time without forming gelled particles due to the high molecular weight fraction. In fact, the latter is absent in this case.

The average molecular weight of an elastomer has an opposite effect on the processability and the stress-strain properties. As the molecular weight is increased, processability is worsened, whereas the stress-strain properties are improved.

Thus, for good processability of an elastomer on a roller mill or an extruder, the average molecular weights are in the order of magnitude of $0.3 \times 10^{-6}$ to $0.6 \times 10^{-6}$ these values ensuring the best admixture of the ingredients.

On the other hand, good mechanical properties, such as lesser heat build-up of an elastomer are obtained with higher average molecular weights.

As a matter of fact, the two chain ends, the number of which is decreased as the molecular weight is increased, are one of the causative factors of the dissipation of mechanical energy in the form of heat. (M. Bruzzone et al., IV Int. Synth. Rubber Symp., London, Sept. 30, 1969).

Elastomers with a high molecular weight, say of $10^6$ and over, are thus required in all uses for which the least heat build-up is a must.

Another use for which polymers with so high a molecular weight is required is in oil-extended polymers.

In conclusion, as outlined above, the catalytic system of this invention permits the production of elastomers having a very high steric purity and responsive to the several practical requirements with respect to the variability of the molecular weights and their distribution.

At present, all this can be obtained by using different catalytic systems and different polymerization procedures.

The diolefines which can be polymerized with the catalytic sytem of the present invention are aliphatic conjugated diolefines such as 1,3-butadiene, 1-substituted butadienes such as 1,3-pentadiene, 2-substituted butadienes such as isoprene, 2,3-substituted butadienes such as 2,3-dimethyl-1,3-butadiene and their mixtures.

The preparation of the catalyst can be carried out either in the absence or the presence of the monomer to be polymerized. The particular procedure which will be followed has no decisive bearing on the polymerization run.

If no monomer is present, the preparation of the catalyst is generally carried out by reacting, in an aliphatic hydrocarbonaceous solvent a cycloaliphatic solvent or an aromatic solvent:

the lanthanide complex as hereinbefore defined, such as, for example $Nd(O-isoC_3H_7)_3$ the aluminum organic compound, such as, for example $Al(isoC_4H_9)_3$; and a Lewis acid, such as, for example $AlBr_3$.

The sequential order set forth can be varied and is not essential to attain the reaction velocity.

The sequential order set forth can be used also for a catalyst prepared "in situ", that is the components of the catalytic system can be added separately to the diolefine to be polymerized, the latter being dissolved in the reaction solvent. It is possible, moreover, to effect the preparation "in situ" by employing small amounts of the diolefine to be polymerized (e.g. with molar ratios of the diolefine to the Lanthanide comprised between 5 and 50).

The proportions of the catalyst components can be varied within a wide range. The molar ratio of the organic derivative of aluminum (component A) and the complex of the Lanthanides (component C) may be varied between 1 and 120. The atomic ratio of the halide ions to the Lanthanide may vary between 0.1 and 10, from 0.8 to 4 being the preferred range.

An interesting aspect of the catalytic system of this invention is its high activity in the polymerization. The amount of catalyst used is thus very low and is a function of the purity of the reagents which are employed. Consistently with the purity, the amount of catalyst normally used varies within the range $0.015 \times 10^{-3}$ to $0.5 \times 10^{-3}$ gram atoms of Lanthanide per 100 grams of monomer, with extremely satisfactory polymerization velocities.

Polymerization can be carried out either in the presence of aliphatic, aromatic and cycloaliphatic hydrocarbonaceous solvents, or in the presence of the monomer alone (mass polymerization).

By carrying out the mass polymerization, extremely high velocities are attained, on the order of a few minutes, and with complete conversion and viscometric molecular weights of the polymer being on the order of $2 \times 10^6$ to $3 \times 10^6$. This means that the chain-transfer reactions with the monomeride are very poorly operative with the catalysts of the invention and this is quite an unusual aspect for this kind of catalysis.

The polymerization according to the method of the invention can be carried out at temperatures between $-50°$ C. and $+150°$ C., the preferred interval being from $+10°$ C. to $+80°$ C. at a pressure variable between 1 and 5 atmospheres, the pressure being generally provided by the vapor pressure of the monomeride(s) under the working conditions which are employed.

The polymers thus obtained have a high content of 1,4-cis units and, more particularly, values higher than 99% can be attained with butadiene.

The intrinsic viscosity of the polymers obtained, as measured in toluene at 30° C., varies from 2 to 16 dl/g being consistent with the conditions employed.

The distribution of the molecular weights, in terms of Mw/Mn ratio, may vary within a wide range consistent with the different requirements of the polymers and their end use.

The polymers are always virtually gel-free and are completely soluble in the common solvents, even when the molecular weight attains its top values.

EXPERIMENTAL PART

Procedure A

In a pop bottle having a capacity of 200 mls which had previously been purged with an inert gas, there were introduced, under a nitrogen blanket, the solvent and then, in the order given, the organic metallic compound of aluminum (A), the diolefine, the Lanthanide complex (C) and the Lewis acid (B).

The bottle is then placed to carry out polymerization in a rotary bath, the temperature of which is thermostatically controlled at the selected temperature and for the necessary time. On completion, the bottle is opened and the contents poured into a half liter of methanol containing 1% of a phenolic antioxidant.

The coagulated polymer is dried in a vacuum at room temperature overnight and is ready for physico-chemical analysis.

Procedure B

A glass reactor equipped with a water-jacket, anchor stirrer and sump valve on the vessel bottom, is charged, with stirring and under a nitrogen stream, with the solvent and the diolefine to be polymerized. By means of the jacket, the internal temperature is brought to the desired value, whereafter there are introduced, in the order given, the organic metallic compound of aluminum (A), the lanthanide complex (C) and the Lewis acid (B). The reactor is maintained stirred at the desired temperature and, after the necessary time, the contents is poured, through the bottom valve, into a vessel containing methanol. The coagulated polymer is dried in an oven and weighed and ready for physico-chemical analysis.

EXAMPLE 1 TO 4

By use of procedure A butadiene is polymerized with alcoholates of various metals of the lanthanide series. Conditions and results are tabulated in Table 1.

TABLE 1

| Ex. | Solvent mls | Diolefine grams | Component A millimol | Component C millimol | Component B millimol | Polymerization temperature °C. | Polymerization time hrs | Yield % | 1,4-cis % |
|---|---|---|---|---|---|---|---|---|---|
| 1 | Hexane 100 | Butadiene 20 | $Al(Bu^i)_3$ 0.75 | $Nd(OBu^n)_3$ 0.05 | $AlBr_3$ 0.05 | 30 | 2 | 97 | 98.1 |
| 2 | Hexane 100 | Butadiene 0 | $Al(Bu^i)_2H$ 1.5 | $Od(OBu^n)_3$ 0.05 | $AlEtCl_2$ 0.075 | 40 | 4 | 80 | 97.8 |
| 3 | Hexane 100 | Butadiene 20 | $Al(Bu^i)_3$ 0.75 | $Dy(OBu^n)_3$ 0.05 | $AlEtCl_2$ 0.075 | 40 | 2 | 82 | 98.0 |
| 4 | Hexane 100 | Butadiene 20 | $Al(Bu^i)_3$ 1.5 | $Pr(OBu^n)_3$ 0.05 | $AlBr$ 0.07 | 40 | 2 | 60 | 98.0 |

EXAMPLES 6 TO 9

By use of procedure A, butadiene is polymerized with various alcoholates of Neodymium. The results are tabulated in Table 2.

TABLE 2

| Ex. | Solvent mls | Diolefine grams | Component A millimols | Component C millimols | Component B millimols | Polymerization temperature °C. | Polymerization time hrs. | Yield % | 1,4-cis % |
|---|---|---|---|---|---|---|---|---|---|
| 5 | Hexane 100 | Butadiene 30 | $Al(Bu^i)_3$ 1.0 | $Nd(OPr^i)_3$ 0.1 | $AlEtCl_2$ 0.17 | 30° | 3 | 93 | 98.4 |
| 6 | Heptane 80 | Butadiene 20.2 | $Al(Bu^i)_3$ 2.0 | $Nd(OPr^n)_3$ 0.1 | $AlBr_3$ 0.066 | 30° | 2 | 85 | 97.8 |
| 7 | Hexane 100 | Butadiene 12 | $Al(Bu^i)_3$ 0.5 | $Nd(OC_5H^i11)_3$ 0.05 | $AlBr_3$ 0.05 | 30° | 1 | 87 | 98.6 |
| 8 | Hexane 80 | Butadiene 10 | $Al(Bu^i)_3$ 0.5 | $Nd(OBu^n)_3$ 0.04 | $AlEtCl_2$ 0.08 | 30° | 0.4 | 90 | 98.0 |
| 9 | Hexane 80 | Butadiene 9.6 | $Al(Bu^i)_3$ 0.5 | $Nd(O^n-C_{10}H_{21})_3$ 0.04 | $AlEtCl_2$ 0.06 | 30° | 0.4 | 76 | 98.0 |

EXAMPLES 10 TO 14

By operating according to procedure A, butadiene is polymerized with Neodymium alcoholates and various Lewis acids.

Table 3 shows the run conditions and the results which are obtained.

TABLE 3

| Ex. | Solvent mls. | Diolefin grams | Component A millimols | Comp. C millimols | Comp. B millimols | Polymerization temperature °C. | Polymerization time | Yield % | 1,4-Cis % |
|---|---|---|---|---|---|---|---|---|---|
| 10 | Hexane 80 | Butadiene 9 | Al(Bu$^i$)$_3$ 0.5 | Nd(OBu$^n$)$_3$ 0.04 | AlBr$_3$ 0.047 | 30 | 0.4 | 88 | 98.2 |
| 11 | Hexane 80 | Butadiene 8.5 | Al(Bu$^i$)$_3$ 0.5 | Nd(OBu$^n$)$_3$ 0.04 | AlJ$_3$ 0.033 | 30 | 0.4 | 50 | 98.1 |
| 12 | Hexane 80 | Butadiene 9 | Al(Bu$^i$)$_3$ 0.5 | Nd(OBu$^n$)$_3$ 0.04 | AlEtCl$_2$ 0.08 | 30 | 0.4 | 90 | 98.0 |
| 13 | Hexane 80 | Butadiene 5.7 | Al(Bu$^i$)$_3$ 0.5 | Nd(O—nC$_{10}$H$_{21}$)$_3$ 0.04 | AlBr$_3$ 0.04 | 30 | 0.4 | 90 | 98.1 |
| 14 | Hexane 80 | Butadiene 8.8 | Al(Bu$^i$)$_3$ 0.5 | Nd(O—nC$_{10}$H$_{21}$)$_3$ 0.04 | AlEtCl$_2$ 0.07 | 30 | 0.4 | 70 | 98.4 |

EXAMPLE 15

A 200 ml pop bottle, which had previously been purged with an inert gas and stoppered with a neoprene gasket and a perforated crown cap is charged by means of a hypodermic needle soldered to a metal bottle with 51.8 grams of liquid butadiene. By means of a metal syringe fitted with a hypodermic needle there are introduced in the order given:

0.24 ml (0.24 millimol) of a solution of isobutylaluminum monohydride (DIBAH) in hexane;

0.26 ml (0.006 millimol) of a solution of Nd(O-nor.C$_{10}$H$_{21}$)$_3$ in hexane; and 0.20 ml (0.012 millimol) of a solution of AlEtCl$_2$ in hexane.

The pop bottle so charged is placed in a rotary bath at 20° C. for 5 hours. On completion of the polymerization of the constituents, the bottle is opened and its contents coagulated with 0.5 liter of methanol and dried in a vacuum oven.

There are obtained 39.5 grams (yield 76.2%) of a polymer having the following physico-chemical analytical data:

1,4-cis: 98.8% [η]$_{toluene}^{30° C.}$ = 5.2 dl/g
Tm = +1.5° C.—Tm is the melting point temperature as measured with the Differential Scanning Colorimeter (DSC).

EXAMPLE 16

A 200 ml pop bottle, which has been purged with nitrogen, is charged, in the order given, with:

100 mls isoprene (68 g)

0.5 ml (0.25 millimol) of a solution of Al(isoBu)$_3$ in hexane;

0.5 ml (0.025 millimol) of a solution of Nd(O-nor.-Bu)$_3$ in hexane; and 0.5 ml (0.04 millimol) of a solution of AlEtCl$_2$ in hexane.

The pop bottle is stoppered and placed in a rotary bath at 50° C. for 3 hrs. On completion of polymerization, the polymer is coagulated with methanol and dried in a vacuum oven. There are obtained 26 grams (yield 38.2%) of a polymer having the following properties:

1,4-cis: 96.5%
3,4: 3.5%

EXAMPLE 17

By use of procedure A butadiene and isoprene are copolymerized in hexane, by employing:

Hexane: 100 mls;
Butadiene: 10 g;
Isoprene; 11.5 g;
Al(isoBu)$_2$H: 0.31 millimol;
Nd(O-nor.Bu)$_3$: 0.026 millimol;
AlEtCl$_2$: 0.052 millimol, at 40° C. for 2 hrs. Coagulation with methanol is carried out, followed by drying. There are obtained 20.4 grams (yield 95%) of a copolymer having the following analytical data:

Butadiene units (in the copolymer): 48% (1,4-cis contents: 98%)
Isoprene units (in the copolymer): 52% (1,4-cis contents: 95%)

EXAMPLES 18 TO 32

Table 4 shows the variation of the weighted mean molecular weight (Mw) between values of 300,000 and 2,000,000 and the variation of the ratio of the weighted mean molecular weight and the arithmetic mean molecular weight, Mw:Mn between values of 2.7 and 19.

In Examples 18 to 28, the polymerization of butadiene is carried out with procedure A, whereas in Examples 29 to 32 procedure B is followed.

TABLE 4

| Ex. | Solvent mls. | Diolefine grams | Component A | millimol | Component C | millimol | Component B | millimol | Polym. temperat. °C. | Polym. time hrs. | Yield % | 1,4-Cis % | $\overline{M}_w \times 10^{-5}$ | $\overline{M} \sqrt{K_n}$ |
|---|---|---|---|---|---|---|---|---|---|---|---|---|---|---|
| 18 | Hexane 200 | 28.4 | TIBA* | 1.8 | Nd(O—nC$_{10}$H$_{21}$)$_3$ | 0.018 | AlEtCl$_2$ | 0.018 | 20 | 5 | 75 | 98.0 | 3.2 | 3 |
| 19 | Hexane 200 | 31.1 | TIBA | 1.44 | Nd(O—nC$_{10}$H$_{21}$)$_3$ | 0.018 | AlEtCl$_2$ | 0.045 | 20 | 3 | 89 | 98.3 | 4.8 | 4.6 |
| 20 | Hexane 100 | 10.8 | TIBA | 1.65 | Nd(OBu$^n$)$_3$ | 0.0065 | AlEtCl$_2$ | 0.013 | 40 | 2 | 68 | 98.0 | 3.4 | 7.0 |
| 21 | Hexane 200 | 28.2 | DIBAH** | 1.17 | Nd(O—nC$_{10}$H$_{21}$)$_3$ | 0.018 | AlEtCl$_2$ | 0.018 | 50 | 4 | 93 | 98.0 | 2.8 | 12.3 |
| 22 | Hexane 200 | 28.5 | DIBAH | 0.72 | Nd(OBu$^n$)$_2$ | 0.018 | AlEtCl$_2$ | 0.036 | 50 | 3.5 | 81 | 98.2 | 6.8 | 12.2 |
| 23 | Hexane 200 | 28.8 | TIBA | 0.90 | Nd(O—nC$_{10}$H$_{21}$)$_3$ | 0.018 | AlEtCl$_2$ | 0.036 | 20 | 3 | 82 | 98.9 | 6.4 | N.D.*** |
| 24 | Hexane 200 | 28.4 | TIBA | 0.37 | Nd(O—nC$_{10}$H$_{21}$)$_3$ | 0.0123 | AlEtCl$_2$ | 0.0185 | 50 | 2.5 | 74 | 98.6 | 10.4 | 3.6 |
| 25 | Hexane | 29 | TIBA | 0.36 | Nd(O—nC$_{10}$H$_{21}$)$_3$ | | AlEtCl$_2$ | | 20 | 5 | 96 | 98.7 | 15.0 | N.D. |

TABLE 4-continued

| Ex. | Solvent mls. | Diolefine grams | Component A millimol | | Component C millimol | Component B millimol | Polym. temperat. °C. | Polym. time hrs. | Yield % | 1,4-Cis % | $\bar{M}_w \times 10^{-5}$ | $\bar{M}\sqrt{K_n}$ |
|---|---|---|---|---|---|---|---|---|---|---|---|---|
| 26 | Hexane 200 | 28.4 | TIBA | 0.36 | Nd(OBu$^n$)$_3$ 0.018 | AlEtCl$_2$ 0.045 0.036 | 20 | 4 | 57 | 98.9 | 20.0 | N.D. |
| 27 | Hexane 200 | 28.5 | DIBAH | 1.17 | Nd(OBu$^n$)$_3$ 0.018 | AlEtCl$_2$ 0.036 | 20 | 7 | 88 | 98.2 | 5.2 | 14 |
| 28 | Hexane 200 | 28.5 | DIBAH | 1.8 | Nd(OBu$^n$)$_3$ 0.018 | AlEtCl$_2$ 0.036 | 20 | 7 | 85 | 98.2 | 4.8 | 19 |
| 29 | Hexane 1500 | 402 | TIBA | 13.3 | Nd(OBu$^n$)$_3$ 0.38 | AlEtCl$_2$ 0.76 | 40 | 1.5 | 80 | 98.4 | 5.5 | 2.7 |
| 30 | Hexane 3800 | 376 | DIBAH | 6.58 | Nd(OC$_{10}$H$_{21}$)$_3$ 0.22 | AlEtCl$_2$ 0.438 | 50 | 2 | 70 | 98.0 | 2.9 | 5.2 |
| 31 | Hexane 1700 | 170 | DIBAH | 2.94 | Nd(OC$_{10}$H$_{21}$)$_3$ 0.098 | AlEtCl$_2$ 0.147 | 50 | 3 | 81 | 98.5 | 5.0 | 5.6 |
| 32 | Hexane 1500 | 205 | DIBAH | 2.74 | Nd(OC$_{10}$H$_{21}$)$_3$ 0.091 | AlEtCl$_2$ 0.137 | 30 | 3 | 60 | 98.6 | 5.4 | 7.9 |

*TIBA = Al(Bu$^n$)$_3$
**DIBAH = Al(Bu$^n$)$_2$H
***N.D. = Not Determined

EXAMPLES 33 TO 35

According to the procedure B butadiene is polymerized with catalysts based on Neodymium alcoholates. Table 5 reports both the conditions and the results of the tests.

It can be seen that the activity of the catalysts (in terms of gram-atoms of Neodymium per 100 grams of diolefine) is close to the claimed value.

TABLE 5

| Ex. | Solvent mls. | Diolefine grams | Component A millimol | | Comp. C millimol | Comp. B millimol | Polymerization temperature °C. | Polymerization time hrs. | Yield % | 1,4-Cis % |
|---|---|---|---|---|---|---|---|---|---|---|
| 33 | Hexane 4000 | 570 | DIBAN | 16.9 | Nd(OBu$^n$)$_3$ 0.26 | AlEtCl$_2$ 0.52 | 50 | 3 | 85 | 98.3 |
| 34 | Hexane 1470 | 205 | DIBAN | 2.74 | Nd(O—nC$_{10}$H$_{21}$)$_3$ 0.0914 | AlEtCl$_2$ 0.137 | 50 | 3 | 90 | 98.6 |
| 35 | Hexane 4624 | 410 | TIBA | 16.9 | Nd(OBu$^n$)$_3$ 0.26 | AlEtCl$_2$ 0.52 | 50 | 3 | 90 | 98.5 |

EXAMPLE 36

A 200 ml pop bottle which had been purged with an inert gas is charged under a nitrogen blanket, with 100 mls of anhydrous nor.hexane and then, in the order given, with 0.05 millimol of Nd(O-isoC$_3$H$_7$)$_3$, 0.5 millimol of Al(isoC$_4$H$_9$)$_3$, 0.058 millimol of AlBr$_3$, corresponding to the following molar ratios:
Component A/Component C=10
Halogen/Neodymium=3.48

The bottle is sealed with a neoprene gasket and a crown cap which is perforated so as to permit the introduction of a hypodermic needle. Then, through a hypodermic needle directly soldered to a metal bottle which contains anhydrous butadiene, there are introduced in the pop bottle 10.5 grams of liquid butadiene. The bottle is then placed on a rotary bath, thermostatically controlled at 30° C., for 2 hrs. to carry out the polymerization of butadiene. On completion of polymerization, the bottle is opened and its contents poured in a half-liter of methanol which contains 1% of a phenolic antioxidant. The coagulated polymer is vacuum dried at room temperature overnight. The yield of solid polymer is 7.5 grams which corresponds to 71.4% of the monomer used. The infrared analysis carried out on a sample dissolved in CS$_2$ provided the following results: 1,4-cis: 98.5%–1,4-trans: 1,4%–1,2: 0.1%.

The intrinsic viscosity, measured at 30° C. in toluene, is 4.25 dl/g. The melting point temperature of the polymer is 0° C. determined with the DSC (Differential Scanning Calorimeter).

EXAMPLE 37

According to the same procedure as set forth in Example 36 the bottle is charged with 100 mls of nor.hexane, 0.1 millimol of Nd(O-iso-C$_3$H$_7$)$_3$, 1 millimol of Al(isoC$_4$H$_9$)$_3$, 0.17 millimol of AlEtCl$_2$ and 30 grams of butadiene, corresponding to the following molar ratio:
Component A to Component C=10
Atomic ratio Halogen to Nd=3.4
Polymerization is carried out at 20° C. for 4 hrs
Dry polymer obtained: 28 g (93% of theory)
Infrared analysis: 1,4-cis=98.4%–1,4-trans: 1.1%–1,2: 0.5%

$[\eta]_{toluene}^{30} = 4.25$ dl/g $\quad \bar{M}_{visc.} = 0.52 \times 10^6$ $T_m$(D.S.C.)= −1° C. $\quad \bar{M}_{osm.} = 0.37 \times 10^6$ Tensile strength (ASTM D-412)=210 kg/cm$^2$
Elongation at break (ASTM D-412)=550%
Modulus at 300% elong. (ASTM D-412)=100 kg/cm$^2$

EXAMPLE 38

According to the same procedure as in Example 36, the bottle is charged with 180 mls nor.heptane, 2.0 millimols of Al(isoC$_4$H$_9$)$_3$, 0.10 millimol of Nd(O-norC$_3$H$_7$)$_3$, 0.066 millimol of AlBr$_3$, 20.2 g of butadiene, corresponding to a molar ratio of the component A to the component C of 20 and to an atomic ratio of halogen to Neodymium of 1.98. Polymerization is carried out at 50° C. for 45 minutes. There are obtained 5.6 grams of polymer, equal to 55% of the monomer used.

Infrared analysis: 1,4-cis: 97.0%–1,4-trans: 2.6%–1,3: 0.4%.

EXAMPLE 39

A glass reactor equipped with water jacket, anchor stirrer and dumping valve on the bottom wall is charged, with stirring and under a nitrogen stream, with 7.7 liters of anhydrous hexane, 21 millimol of Al(isoC$_4$H$_9$)$_3$, 1.92 millimol of Nd(O-norC$_4$H$_9$)$_3$, 1.28 millimol of AlBr$_3$, corresponding to a molar ratio of component A to component C of 11 and to an atomic ratio of halogen to Neodymium of 2.

420 grams of butadiene are introduced through a cock connected by stainless tubing to the reactor and to a metal bottle containing liquid butadiene. The reactor contents is kept stirred at 25° C. and water is caused to circulate in the water-jacket. After 3 hrs. the contents of the reactor is poured through the bottom wall valve into a container full of methanol. The coagulated polymer is oven dried and weighed: there are obtained 395 grams of solid polymer, equal to 94% of the monomer used.

Infrared analysis: 1,4-cis: 98.7%; 1,4-trans: 1.1%–1,2: 0.2%

$[\eta]_{toluene}^{30°} = 5.8$ dl/g $\overline{M}_{viscometric} = 0.8 \times 10^6$; $\overline{M}_{osmotic} = 0.3 \times 10^6$ Mooney value ML(1+1) 100° C. = 91.5

EXAMPLE 39

A glass reactor fitted with a water-jacket, an anchor stirrer and a discharge valve on the bottom wall is charged, with stirring and under a nitrogen stream, with 7.7 liters of anhydrous nor.hexane, 21 millimoles of Al(isoC$_4$H$_9$)$_3$, 1.92 millimol of Nd(O-nor.C$_4$H$_9$)$_3$, 1.28 millimol of AlBr$_3$, corresponding to a molar ratio of component A to component C of 11 and to an atomic ratio of halogen to Neodymium of 2.

420 grams of butadiene are introduced through a cock connected to the reactor by a stainless steel tube and to a small metal bottle which contains liquid butadiene.

The contents of the reactor is kept stirred at a temperature of 25° C., water being circulated through the water jacket. After 3 hrs. the contents of the reactor is poured through the bottom valve into a methanol containing vessel. The coagulated polymer is oven dried and weighed. There are obtained 395 grams of a solid polymer corresponding to 94% of the monomer used.

Infrared analysis: 1,4-cis: 98.7%; 1,4-trans: 1.1%; 1,2: 0.2%.

$[\eta]_{toluene}^{30} = 5.8$ dl/g $\overline{M}_{viscom.} = 0.8 \times 10^6$; $\overline{M}_{osmom.} = 0.3 \times 10^6$ Mooney value ML(1+1) 100° C. = 91.5.

EXAMPLE 40

According to the same procedure as in Example 39 there are introduced in the reactor 7.5 liters of nor.hexane, 21.0 millimols of Al(isoC$_4$H$_9$)$_3$, 1.92 millimol of Nd(O-nor.C$_4$H$_9$)$_3$, 1.29 millimol of AlEtCl$_2$ and 390 grams of butadiene, the molar ratio of component A to component C being 11 and the atomic ratio of halogen to Neodymium being 1.34. The polymerization run at 25° C. lasts 3 hrs.

There are obtained 312 grams (yield 80%) of solid polymer.

Infrared analysis: 1,4-cis: 98.8%; 1,4-trans: 1.0%; 1,2: 0.2%

$[\eta]_{toluene}^{30°} = 5.3$ dl/g

EXAMPLE 41

According to the procedure of Example 39 the reactor is charged with 7.6 liters of nor.hexane, 397 grams of butadiene, 21.0 millimols of Al(iso-C$_4$H$_9$)$_3$, 1.92 millimol of Nd(O-norC$_{10}$H$_{21}$)$_3$ and 1.28 millimol of AlBr$_3$, corresponding to a molar ratio of component A to component C of 10.9 and to a molar ratio of halogen to Neodymium of 2.0.

Polymerization is carried out at 25° C. during 3 hours. There are obtained 390 grams (yield 98.5%) of solid polymer.

$[\eta]_{toluene}^{30°} = 5.8$ dl/g

EXAMPLE 42

According to the same procedure as described for Example 36 the pop bottle is charged with 100 mls hexane, 31 grams of butadiene, 0.1 millimol of Nd(O-norC$_{10}$H$_{21}$)$_3$, 0.25 millimol of AlEtCl$_3$ and, lastly, as the component A, 0.042 of ene(N-isopropyliminoalane) [(HAlN-isoC$_3$H$_7$)$_6$] corresponding to 0.5 milligramatoms of aluminum.

The bottle is sealed and polymerization is carried out for 6 hrs at 50° C. There are obtained 24.8 g of dry polymer. The infrared analysis gives 1,4-cis: 98.0%

$[\eta]_{toluene}^{30°} = 8.7$ dl/g.

We claim:

1. Method for the polymerization or copolymerization of butadiene or isoprene consisting in carrying out the reaction in the presence of a catalytic system composed of:

(A) an aluminum trialkyl having the formula,

AlR$_3$ wherein R is an alkyl radical containing from 1 to 20 carbon atoms, (B) an aluminum halide or alkyl aluminum halide having the formula AlX$_a$R$_{3-a}$ wherein R is an alkyl radical containing from 1 to 20 carbon atoms, X is chlorine or bromine and a is an integer from 1 to 3, and (C) Neodymium alcoholate having the formula, Nd(OR)$_3$ wherein R is an alkyl radical containing from 1 to 20 carbon atoms.

2. A method according to claim 1 wherein the reaction is carried our with an amount of catalyst, referred to the metal Neodymium, which varies from 0.015 to $10^{-3}$ to $0.5 \times 10^{-3}$ gramatoms of Neodymium alcoholate per 100 grams of monomer.

3. A method according to claim 1 wherein the molar ratio of component A to component C of the catalytic system is between 1 and 120.

4. A method according to claim 1 wherein the atomic ratio of the halogen ions to the Neodymium alcoholate varies from 0.1 to 10.

5. A method according to claim 1 wherein the reaction is carried out at a temperature which varies from $-50°$ C. to $+150°$ C.

6. A method according to claim 1 wherein the reaction is carried out at a pressure which varies from 1 to 20 atmospheres.

7. A method according to claim 1 wherein the reaction is carried out in the presence of solvents selected from the group consisting of aliphatic, aromatic and cycloaliphatic hydrocarbons.

8. A method according to claim 1 wherein the reaction is carried out in the absence of solvent and in the presence of monomer alone.

9. A method according to claim 1 wherein the reaction is carried out at a temperature between $+10°$ C. and 80° C.

10. A method according to claim 1 wherein the reaction is carried out at a pressure from 1 to 5 atmospheres.

11. Catalyst system for polymerizing or copolymerizing butadiene or isoprene composed of:
(A) an aluminum trialkyl having the formula $$AlR_3$$

wherein R is an alkyl radical containing from 1 to 20 carbon atoms,
(B) an aluminum halide or alkyl aluminum halide having the formula $$AlX_aR_{3-a}$$

wherein R is an alkyl radical containing from 1 to 20 carbon atoms, X is chlorine or bromine and a is an integer from 1 to 3, and
(C) Neodymium alcoholate having the formula, $$Nd(OR)_3$$

wherein R is an alkyl radical containing from 1 to 20 carbon atoms.

12. Catalytic system according to claim 11 wherein the amount of catalyst referred to the metal Neodymium varies from $0.015 \times 10^{-3}$ to $0.5 \times 10^{-3}$ gramatoms of Neodymium alcoholate per 100 grams of monomer.

13. Catalytic system according to claim 11 wherein the molar ratio of component A to component C of the catalytic system is between 1 and 120.

14. Catalytic system according to claim 11 wherein the atomic ratio of the halogen ions to the Neodymium alcoholate varies from 0.1 to 10.

* * * * *